Patented Feb. 23, 1943

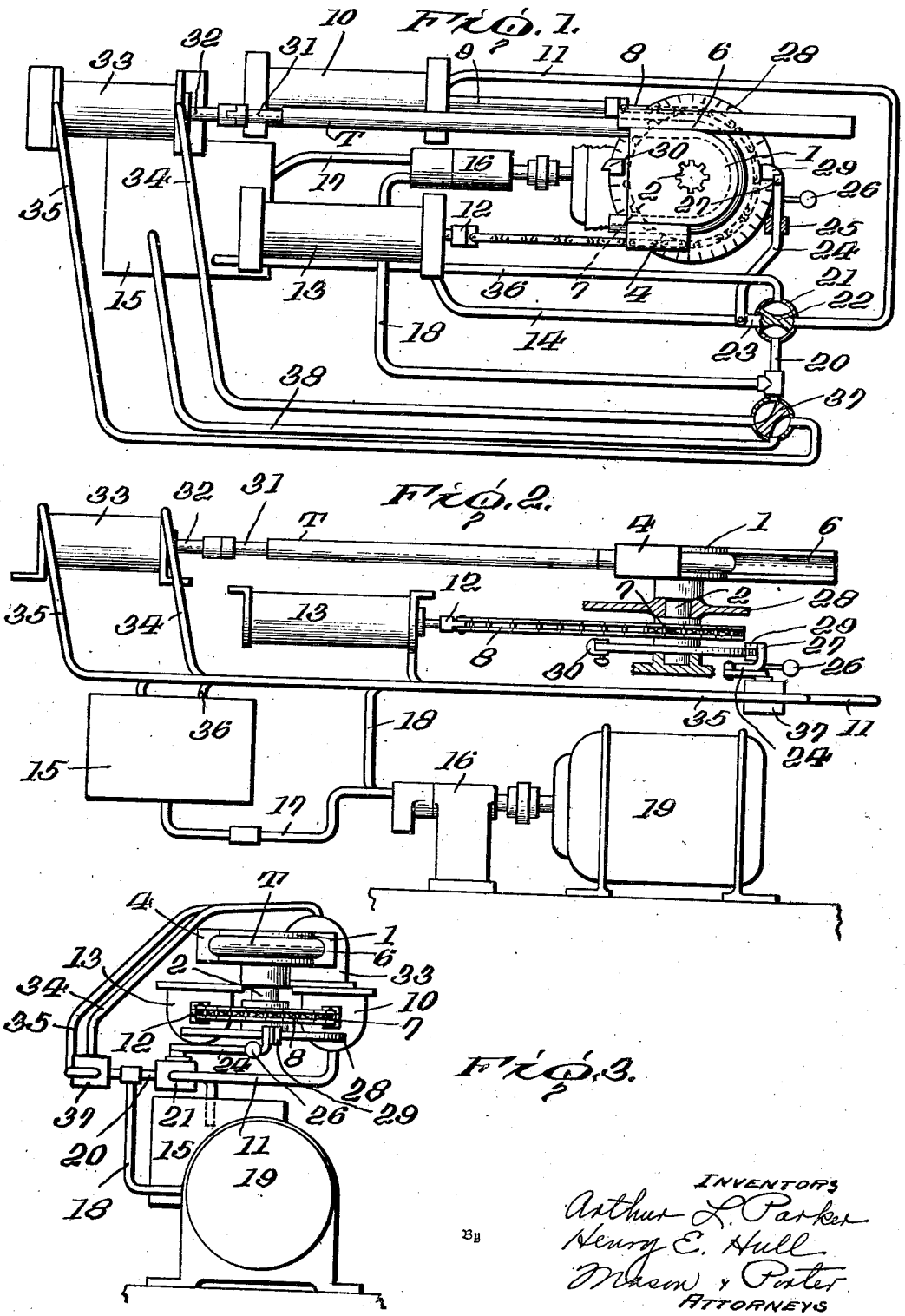

2,312,122

UNITED STATES PATENT OFFICE 2,312,122

PIPE BENDER

Arthur L. Parker and Henry E. Hull, Cleveland, Ohio; said Hull assignor to said Parker Application March 31, 1941, Serial No. 386,224

4 Claims. (Cl. 153—40)

The invention related to new and useful improvements in a pipe bending machine of the type shown and described in the application filed jointly by Arthur L. Parker and Henry E. Hull, January 16, 1940, Serial No. 314,042, which matured into Patent No. 2,306,221, dated December 22, 1942.

An object of the invention is to provide fluid operated motors for rotating the pipe bending radius block for the bending operation and for returning the radius block to its initial position.

A further object of the invention is to provide a fluid operated motor for retracting the anvil after the pipe has been bent to the desired shape.

A still further object of the invention is to provide a controlled mechanism for shutting off the fluid and stopping the motor when the pipe has been bent to a desired angle.

In the drawing:

Figure 1 is a view partly in plan and partly in section showing a bending machine embodying the improvements.

Figure 2 is a view partly in side elevation and partly in vertical section of the bending machine illustrated in Figure 1.

Figure 3 is an end view of same.

In the drawing, the radius block indicated at 1 is of the construction shown in the application referred to above. Said block is mounted on a shaft 2. Instead of securing the radius to a plate attached to the shaft in the illustrated construction, the radius block is splined to the shaft so that it may be readily removed and a block of a different radius substituted therefore. Associated with this radius block is a clamping block 4 which clamps the end of the pipe indicated at T against the radius block so that during the rotation of the radius block the pipe will be bent around the radius block so as to conform to the shaping of the peripheral portion of the radius block. Also associated with the radius block 1 is a guide block 6 which contacts with the pipe and moves with the pipe during the bending thereof. These parts are similar in construction to those shown in the application referred to above and further detailed description thereof is not thought necessary.

The shaft 2 carrying the radius block 1 is mounted in suitable bearings in the supporting frame so that it rotates about a vertical axis. Mounted on the shaft 2 is a sprocket wheel 7. Running over the sprocket wheel 7 is a sprocket chain 8. One end of the sprocket chain 8 is connected to a piston rod 9 attached to a piston mounted for reciprocating in a cylinder 10. The end of the cylinder through which the piston rod 9 extends is connected with a fluid supply pipe 11. The other end is vented to the atmosphere. This fluid motor is of the usual construction and further detailed description thereof is not thought necessary.

The other end of the sprocket chain 8 is connected to a piston rod 12 which in turn is connected to a piston mounted for reciprocation in a cylinder 13. This cylinder is supplied with fluid from a pipe 14.

As shown in Figure 1, the pipe has been bent or curved to the desired angle and during this bending operation the radius block rotated in a clockwise direction. Fluid was admitted to the cylinder 13 which forced the piston therein to the left hand end of the cylinder as viewed in Figure 1. This pulled on the sprocket chain and rotated the radius block in the direction stated. The radius block is returned to its initial position by directing fluid into the cylinder 10 so that the piston therein will move to the left hand end of the cylinder.

Fluid is supplied from a reservoir or sump indicated at 15 in the drawing. A pump 16 of any desired construction is used for drawing the fluid through the line 17 from the sump or reservoir and for discharging the fluid under pressure into the line 18. The pump is driven by a motor 19. The supply pipe 18 is connected to a pipe 20 which in turn is connected to a valve casing 21 in which is located a valve 22. An arm 23 attached to the valve serves as a means for turning the same. This arm is connected to a rod 24 mounted for endwise reciprocation in a supporting bearing 25. The rod is provided with a handle 26. The end of the rod adjacent to the handle 26 is bent laterally as indicated at 27 in Figures 2 and 3. Mounted on the shaft 2 and rotating therewith is a graduated control disc 28. This disc has mounted thereon stop arms 29 and 30 which may be adjusted on the disc to any desired set position. As shown in Figure 1, this stop arm 29 has moved with the radius disc until it was brought into contact with the laterally bent end of the rod 24 and this shifted the valve to the position shown in the drawing. In this position, the fluid from the pipe line 18 is neither delivered to the pipe line 14 nor the pipe line 11. Therefore, the fluid motor 13 stops in this position as shown in Figure 1.

When the valve 22 is turned through a 90° angle in a clockwise direction, then the pipe 20 is connected to the pipe 14 and fluid will flow to the motor 13. This was the setting of the valve which brought about the bending operation. The stop arm 29, as noted, contacted with the rod 24 and shifted the valve in a counter clockwise direction to the position shown. If the handle is grasped and the rod pushed further downward, the valve will be turned so as to connect the fluid supply pipe 20 with the pipe 11 and this will cause the piston in the motor 10 to move to the left and turn the radius block in a counter clockwise direction. When the radius block is returned to its initial position, then the stop arm 30 contacting with the bent end of the rod will lift the arm and bring the valve back to the stop position shown in Figure 1.

In order to bend the pipe around the radius block without collapsing the pipe at the immediate point of bending, an anvil 31 is inserted in the pipe so as to bring the end of the anvil to the point in the pipe where the bending is to take place. The anvil is connected to a piston rod 32 attached to a piston mounted for reciprocation in a cylinder 33. Fluid is supplied through the pipe 34 to the cylinder for moving the piston to the left and this will retract the anvil from its forward position.

Fluid may be supplied from the line 35 to the opposite end of the cylinder 33 for moving the anvil forward. There is means associated with each of the fluid motors for providing for the exhaust of the fluid therefrom and the return of same to the sump, or reservoir 15. There is a pipe 36 extending from the valve casing 21 to the sump 15. When the valve is set so as to direct the fluid from the line 18 and then to the pipe 14, then the pipe 36 is connected to the pipe 11. As the piston moves to the left in the fluid motor 13 the piston in the fluid motor 10 will move to the right through the pull of the sprocket chain thereon and the fluid will be exhausted through the line 11 and the pipe 14 to the sump. Likewise, when fluid is furnished the motor 10 by a setting of the valve so as to connect the pipe 11 with the pipe 20, then the pipe 36 is connected to the pipe 14.

The fluid for operating the motor 33 which moves the mandrel is controlled by a valve 37 which is hand-operated. When the valve is in the position shown in Figure 1, then the pipe 18 is connected to the pipe 34 and fluid is furnished to the right hand end of the fluid motor 33 for retracting the anvil. At this time the pipe 35 is connected to the pipe 38 which leads to the sump or supply reservoir. By shifting the valve 37, the pipe 35 may be connected to a supply line 30 and when so shifted then the pipe 34 will be connected through the pipe 38 with the sump.

It is thought that the operation of the pipe bending machine is obvious from the description given. Starting with the position of the parts as shown in Figure 1, the pipe is bent to proper shape and in order to remove the pipe from the machine, the motor 33 is connected with the fluid supply line so that the anvil will be retracted, that is, moved away from the bending position. Then the guide block and the clamping block are both moved away from the radius block, releasing the pipe so that it may be removed and slipped off from the anvil. The operator then turns the valve 22 so that it returns the radius block to its initial set position. A pipe to be bent is inserted on the anvil and the radius block and guide block brought up into operative position relative thereto. Then the operator turns the valve 22 so as to direct fluid through the motor 13 and this will cause the radius block to turn in a clockwise direction and bend the pipe. The extent to which the pipe is bent is determined by the setting of the stop arm 29. If the stop arm is set as shown in Figure 1, then the pipe will be bent through an angle of 180° and the machine will automatically stop.

It is obvious that many changes in the details of construction may be made without departing from the spirit of the invention as set forth in the appended claims.

We claim:

1. A pipe bending machine comprising a radius block, a shaft connected to the radius block for rotating the same, a clamping block for securing the pipe end to the radius block, fluid operated means for rotating the shaft, for bending the pipe and for returning the radius block to its initial set position, and a valve mechanism for directing operating fluid to the operating means, a controlled disc mounted on shaft, stop arms adjustable on said disc and means operated by said stop arms for shifting the valve mechanism so as to shut off the operating fluid when the radius block has turned through a predetermined desired angle and for shutting off the fluid when the radius block has returned to its initial set position.

2. A pipe bending machine comprising a radius block, a shaft connected to the radius block for rotating the same, a clamping block for securing the pipe end to the radius block, fluid-operated means for rotating the shaft for bending the pipe, a valve mechanism for directing operating fluid to the operating means, a control means mounted on said shaft and moving therewith including an adjustable stop arm, and means operated by said stop arm for shifting the valve mechanism so as to shut off the operating fluid when the radius block is turned through a predetermined desired angle.

3. A pipe bending machine comprising a radius block, a shaft connected to the radius block for rotating the same, a clamping block for securing the pipe end to the radius block, a sprocket wheel mounted on said shaft, a sprocket chain running over said sprocket wheel, a fluid operating motor connected to one end of the sprocket chain for rotating the radius block for bending the pipe, a means connected to the other end of the chain for returning the radius block to its initial set position, a valve mechanism for directing operating fluid to the fluid motor, a control means mounted on said shaft and moving therewith including an adjustable stop arm and means operated by said stop arm for shifting the valve mechanism so as to shut off the operating fluid when the radius block is turned through a pre-determined desired angle.

4. A pipe bending machine comprising a radius block, a shaft connected to the radius block for rotating the same, a clamping block for securing the pipe end to the radius block, a sprocket wheel mounted on said shaft, a sprocket chain running over said sprocket wheel, a fluid operating motor connected to one end of the sprocket chain for rotating the radius block for bending the pipe, a fluid motor connected to the other end of the sprocket chain for rotating the radius block to return it to initial position, a valve mechanism for directing operating fluid selectively to the fluid motors, a control disk mounted on said shaft, stop arms adjustable on the disk and means operated by said stop arms for shifting the valve mechanism so as to shut off the operating fluid when the radius block has turned through a pre-determined desired angle and for shutting off the fluid when the radius block has returned to its initial set position.

ARTHUR L. PARKER.
HENRY E. HULL.